(12) United States Patent
Zuzarte et al.

(10) Patent No.: US 7,454,416 B2
(45) Date of Patent: Nov. 18, 2008

(54) METHOD FOR AGGREGATION SUBQUERY JOIN ELIMINATION

(75) Inventors: Calisto P Zuzarte, Pickering (CA); Qi Cheng, North York (CA); Wenbin Ma, Markham (CA)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/428,263

(22) Filed: Apr. 30, 2003

(65) Prior Publication Data
US 2004/0220911 A1 Nov. 4, 2004

(51) Int. Cl.
*G06F 7/00* (2006.01)
*G06F 17/30* (2006.01)
(52) U.S. Cl. .............................. 707/4; 707/3
(58) Field of Classification Search ............. 707/1–4, 707/102
See application file for complete search history.

(56) References Cited

U.S. PATENT DOCUMENTS

| 5,412,804 | A | * | 5/1995 | Krishna | 707/2 |
| 6,341,281 | B1 | * | 1/2002 | MacNicol et al. | 707/3 |
| 6,370,524 | B1 | * | 4/2002 | Witkowski | 707/3 |
| 6,775,681 | B1 | * | 8/2004 | Ballamkonda et al. | 707/102 |
| 6,826,562 | B1 | * | 11/2004 | Leung et al. | 707/4 |
| 6,847,962 | B1 | * | 1/2005 | Cochrane et al. | 707/4 |
| 2002/0059203 | A1 | * | 5/2002 | Witkowski et al. | 707/3 |

OTHER PUBLICATIONS

Yan, et al. "Easy Aggregation and Lazy Aggregation", Morgan Kaufmann Publishers Inc, Proceedings of the 21th International Conference on Very Large Data Bases, pp. 345-357.*

* cited by examiner

*Primary Examiner*—Charles Rones
*Assistant Examiner*—Charles D Adams
(74) *Attorney, Agent, or Firm*—Sawyer Law Group LLP

(57) ABSTRACT

A method for use with an information retrieval system, in which the method is used for transforming a database statement containing a first subquery and a second subquery joined together, the first subquery including a group by operation over a child subquery, the method comprising removing the first subquery from the database statement thereby removing the join between the first subquery and the second subquery.

5 Claims, 4 Drawing Sheets

```
            select
        ... /    \ ........
          gb subq2
           |
          subq1 original query
```

```
        select                    select
     ... /   \ .....           .....  |  .....
     gb    subq2                     subq2
      |
     subq1
```

Fig. 1 original query            Fig. 2 transformed query

```
    select              select                select
  ... /  \ ...       .... /  \ ...              |
  gb    subq2        gb    sel_comp          subq2
   |                  |      |
  subq1              subq1  subq1
```

Fig. 3 original query    Fig. 4 after matching    Fig. 5 transformed query

```
    select              select                select
  .... /  \ ........    /  \                    |
  gb subq2            gb    gb_comp          subq2
   |                   |      |
  subq1              subq1  subq1
```

Fig. 6 original query    Fig. 7 after matching    Fig. 8 transformed query

```
       select                         select + replace gb aggregation
                                     by window aggregation over subq2
    .... / \ ........                    ..... | .......
      gb   subq2                              subq2
      |
     subq1

Fig. 9 original query              Fig. 10 transformed query select  local predicate on gb      select  local predicate on window aggregation
    .... / \ ........                            |
      gb   subq2                 select (+ gb aggregation replaced by window aggregation)
      |                                          |
     subq1                                     subq2

Fig. 11 original query             Fig. 12 transformed query
```

```
         select                          select ( + predicate on window aggregate function)
      ..../     \ ........                        ........ | ......
   select        subq2                   select (+ gb aggregation replaced
  (+ having predicate)                              by window aggregation)
         |                                          |
         gb                                       subq2
         |
       subq1
```

Fig. 13 original query                    Fig. 14 transformed query

```
         select                                  select
      local  predicate on gb              + local predicate on window aggregate + having predicate
      ..../     \ ........                        ........ | ......
   select having    subq2                 select (+ gb aggregation replaced by window aggregation)
         |                                          |
         gb                                       subq2
         |
       subq1
```

Fig. 15 original query                    Fig. 16 transformed query

```
    select                  select              select having max_salary > 100000
      |                       |                       |
     gb2                     gb2                     gb2
      |                       |                       |
    select              select + having             select
   / | \                  / | \                    /   \
dept empmax emp         dept gb1 emp             dept   emp
                              |
                            subq1
```

Fig. 17 after IN to JOIN    Fig. 18 expanded version    Fig. 19 internally transformed
                                   of Fig 17                      query

METHOD FOR AGGREGATION SUBQUERY JOIN ELIMINATION

FIELD OF THE INVENTION

The present invention generally relates to information retrieval systems, and more specifically relates to information retrieval systems adapted to perform aggregation subquery join eliminations.

BACKGROUND

A complex language like SQL (Structured Query Language) is often riddled with redundancy. A query language is used to write a query which is then submitted to an information retrieval system (sometimes called a database management system) so that the system may then obtain a response to the query (such as obtaining data stored in a database). It will be appreciated that a query may be asked or formed (structured) in many different ways. Users, query generators or application developers may not always write queries that are ideal for performance if that query is executed in the way that query is written. The reasons may be that there may be redundancy that is not intentional or that the user may not be sufficiently knowledgeable to write the query in a more efficient way. Looking at this from a different angle, a common practice is to give access to the database to users through predefined views of a database. These views may be predefined to hide the complexity of queries or to limit the data that may be viewed by users. Even though the queries may look simple, once these views are expanded and merged into the query, a database query compiler may have to process a very complex query. These queries may also end up with redundancy or less efficient queries when executed in its raw form.

Database management systems (sometimes referred to a database engines or simply DBMS) often include a given query rewrite mechanism used for transforming queries so as to make the given query more efficient. Removing redundancy is one of the primary goals of the query rewrite mechanism (sometimes called a component). Query languages continue to evolve and DBMS vendors continue to enhance their products. New versions of query languages may support more powerful language constructs but existing queries are not always changed to reflect the evolution in query languages. In order to exploit these query language enhancements within the DBMS, automatic internal query rewrite technology should be able to take advantage of new features without forcing existing application programs (those programs that generate queries) to change.

In the context of subqueries, much of the literature is focused on the unnesting of subqueries where the execution time is improved by suitably converting the subqueries into joins and/or using common subexpressions. Particularly beneficial for a massively parallel system (shared-nothing) environment, methods to decorrelate this query have been proposed. As disclosed in W. Kim. "*On Optimizing an SQL-Like Nested Query*", ACM Transactions on Database Systems, 7 Sep. 1982, certain fixed forms of complex queries were recognized and rewritten. The work of U. Dayal: "*Of Nests and Trees: A Unified Approach to Processing Queries that Contain Nested Subqueries, Aggregates and Quantifiers*"; Proceedings on the Eighteenth International Conference on Very Large Databases (VLDB) pp. 197-208, 1987 improved on the technique where the use of the outer join solved the wrong result issue when the result of the subquery was empty. As disclosed in R. Ganski and H. Wong "*Optimization of Nested SQL Queries Revisited*", Proceedings of ACM SIGMOD, San Francisco, Calif., U.S.A., 1987 pp 22-33, correlation values are collected in a temporary table and a distinct collection is projected before joining to the subquery.

A technique is disclosed in the following three references:

(1) I. S. Mumick, H. Pirahesh, and R. Ramakrishnan, *The Magic of Duplicates and Aggregates. In Proceedings*, 16th International Conference on Very Large Data Bases, Brisbane, August 1990;

(2) C. Leung, H. Pirahesh, P. Seshadri and J. Hellerstein, *Query Rewrite Optimization Rules in IBM DB2 Universal Database*, in Readings in Database Systems, Third Edition, M. Stonebraker and J. Hellerstein (eds.), Morgan Kaufmann, pp. 153-168, 1998; and, (3) P. Seshadri, H. Pirahsh and T. Y. C. Leung, *Complex Query Decorrelation*, Proceedings of the International Conference on Data Engineering (ICDE), Louisiana, USA, February 1996;

This technique is called magic decorrelation, and it was developed where the relevant distinct values of the outer references are extracted and, based on these values, all the possible results from the subquery are materialized. The materialized results are joined with the outer query block on the outer referenced values. Although the rewritten query introduces extra views, joins and duplicate removal, better performance is expected since the subquery is evaluated once with a consolidated temporary relation and avoids a tuple-at-a-time communication overhead.

Decorrelation is not always possible and in some cases, even if possible, may not always be efficient. Jun Rao and Kenneth A. Ross, *A New Strategy for Correlated Queries*, Proceedings of the ACM SIGMOD Conference, pages 37-48, ACM Press, New York, 1998, discloses another technique where a portion of the query that is invariant with respect to the changing outer values is cached. The cached result is reused in subsequent executions and combined with the new results in the changing portion of the subquery.

The recognition of redundancy and inefficiency when processing such queries in commercial databases is evident in the following disclosures:

(1) D. Chatziantoniou and K. A. Ross, *Querying multiple features of groups in relational databases*, in Proceedings of the 22nd International Conference on Very Large Databases, pages 295-306, 1996; and, (2) D. Chatziantoniou and K. A. Ross, *Groupwise processing of relational queries*, in Proceedings of the 23rd International Conference on Very Large Databases, Athens, pp 476-485, 1997.

In these disclosures, an extension of the SQL syntax is proposed that allows more efficient processing to be done on a group-by-group basis. This makes the queries simpler and easier to handle in the optimizer. The SQL standard compliant window aggregate functions syntax already implemented in DB2 Universal Database is a more powerful syntax. It also provides a way of expressing the queries that allows a reduction of redundancy and inefficiency. The subject of our paper is to transform queries automatically to exploit this relatively new feature.

C. A. GalindoLegaria and M. Joshi, *Orthogonal Optimization of Subqueries and Aggregation*, in Proceedings of ACM SIGMOD, International Conference on Management of Data, Santa Barbara, Calif., U.S.A. 2001, discloses decorrelation techniques adopted in the Microsoft® SQL Server product are described. The concept that is most relevant is one called SegmentApply. Whenever a join connects two instances of an expression and one of the expressions has an extra aggregate and/or a filter, they try to generate a common sub-expression (CSE). The extra aggregation is done on one consumer of the CSE and is joined to all rows in that group from the other consumer of the CSE. This is done one group at a time. They also consider pushing appropriate joins through the CSE.

So far none of the automatic techniques involve outright automatic elimination of subqueries. They are either decorrelated using additional joins or use a common sub-expression or run time cache to share common processing. A more recent technique to handle nested subqueries that might typically be correlated although the technique can handle non correlated subqueries is described by C. Zuzarte, H. Pirahesh, W. Ma, Q. Cheng, L. Liu, K. Wong. "*WinMagic: Subquery Elimination Using Window Aggregation*" in Proceedings of ACM SIGMOD, International Conference on Management of Data, San Diego, Calif., U.S.A. 2003. WinMagic uses SQL Window Aggregation functions to replace regular aggregation function and merges the outer and inner subqueries effectively eliminating the nested subquery. Here too the focus is on nested subqueries.

Related to this paper is the work on redundant join elimination. Redundant join elimination is useful to improve the performance of a query. Semantic query optimization techniques have been recognized to provide significant performance benefits and redundant join elimination is one such technique that has been written about before. In particular, using Referential Integrity relationships, one can do redundant join elimination as disclosed in M. Zaharioudakis, R. Cochrane, G. Lapis, H. Pirahesh and M. Urata. *Answering complex SQL queries using automatic summary tables*, in SIGMOD 2000, pages 105-116. In this automatic rewrite technique, a query may contain a join for which the result could be determined without the need for the join. The fact that the two tables are related through a child-parent Referential Integrity constraint, implies that every qualifying row from the child table matches one and only one row in the parent. If the parent table columns are not required in the output of the query, the join is redundant and can be eliminated.

Another example is the elimination of redundant outer joins. Here the condition is less stringent. Given a view containing T1 LOJ T2, a unique index on T2 covering the join columns is sufficient to eliminate the join if the query on the view does not require data from T2.

Accordingly, a solution that addresses, at least in part, this and other shortcomings is desired.

SUMMARY

The present invention provides a method and a system for rewriting a query that contains joins and aggregation to reduce or remove redundancy.

The present invention is focused on the join of two related subqueries at the same level within the query. As such, it does not relate to nested subqueries but rather the join of two subqueries at the same level of the query.

Group by and join operations are two basic SQL operations. They are widely used in SQL queries in many application areas, especially in data warehouse applications. In order to illustrate how common these operations are, the TPCH benchmark suite of queries that is used to measure database performance in this area has 22 queries. Out of these, there are 15 queries using group by and join operations. It is very important and highly desirable for a DBMS to handle these operations efficiently. More often than not, application queries reference views that could contain these joins and group by operations. The queries themselves may not need all the data output from these views. Elimination of redundancy is an important optimization that is needed to improve the performance of these queries. There has been much research on how to optimize query involving join and group by in relational data base field. Many optimization technologies, such as exchanging join and group by operation order, have been developed to handle queries with join and group by efficiently. The present invention provides an approach to optimize the query having joins and group by. This approach optimizes the query by recognizing the potential lossless join when the group by items are identical to the join columns and can therefore eliminate joins.

According to one aspect of the present invention, there is provided, for an information retrieval system, a method for transforming a database statement containing a first subquery and a second subquery joined to the first subquery, the first subquery including a group by operation over a child subquery, the method including removing the first subquery from the database statement to remove the join between the first subquery and the second subquery.

According to another aspect of the present invention, there is provided an information retrieval system for transforming a database statement containing a first subquery and a second subquery joined to the first subquery, the first subquery including a group by operation over a child subquery, the information retrieval system including means for removing the first subquery from the database statement to remove the join between the first subquery and the second subquery.

According to yet another aspect of the present invention, there is provided a computer program product having a computer readable medium tangibly embodying computer executable code for directing an information retrieval system to transform a database statement containing a first subquery and a second subquery joined to the first subquery, the first subquery including a group by operation over a child subquery, the computer program product including code for removing the first subquery from the database statement to remove the join between the first subquery and the second subquery.

BRIEF DESCRIPTION OF THE DRAWINGS

Other aspects and features of the present invention will become apparent to those of ordinary skill in the art upon review of the following description of the specific embodiments of the present invention in conjunction with the accompanying figures, in which:

FIG. 1 is a representation of a first given query to be transformed by a first embodiment;

FIG. 2 is a representation of a first transformed query transformed from the first query of FIG. 1 by usage of the first embodiment;

FIG. 3 is a representation of a second given query to be transformed by a second embodiment;

FIG. 4 is an intermediate query transformed from the second given query of FIG. 3;

FIG. 5 is a representation of a second transformed query transformed from the second given query of FIG. 3 by usage of the second embodiment;

FIG. 6 is a representation of a third given query to be transformed by a third embodiment;

FIG. 7 is another intermediate query transformed from the third given query of FIG. 6;

FIG. 8 is a representation of a third transformed query transformed from the third given query of FIG. 6 by usage of the third embodiment;

FIG. 9 is a representation of a fourth given query to be transformed by a fourth embodiment;

FIG. 10 is a representation of a fourth transformed query transformed from the fourth given query of FIG. 9 by usage of the fourth embodiment;

FIG. 11 is a representation of a fifth given query to be transformed by a fifth embodiment;

FIG. 12 is a representation of a fifth transformed query transformed from the fifth given query of FIG. 11 by usage of the fifth embodiment;

FIG. 13 is a representation of a sixth given query to be transformed by a sixth embodiment;

FIG. 14 is a representation of a sixth transformed query transformed from the sixth given query of FIG. 13 by usage of the sixth embodiment;

FIG. 15 is a representation of a seventh given query to be transformed by a seventh embodiment;

FIG. 16 is a representation of a seventh transformed query transformed from the seventh given query of FIG. 15 by usage of the seventh embodiment;

FIG. 17 is a representation of an eighth given query to be transformed by an eighth embodiment;

FIG. 18 is yet another intermediate query transformed from the eighth given query of FIG. 17;

FIG. 19 is a representation of an eighth transformed query transformed from the eighth given query of FIG. 17 by usage of the eighth embodiment; and, FIG. 20 is a representation of a window aggregation function.

Figure 20:
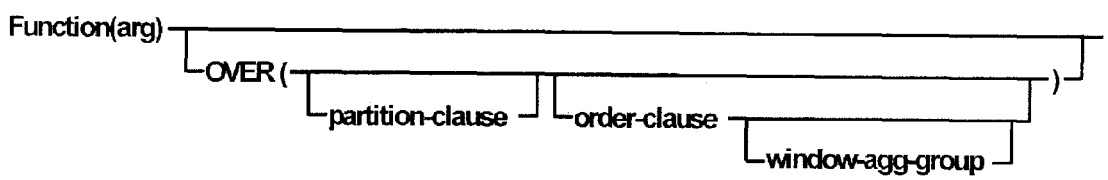

Similar references are used in different figures to denote similar components.

DETAILED DESCRIPTION OF THE PREFERRED EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system, computer programming language, or data processing system and would not be a limitation of the present invention.

The present invention may be embodied as a method for directing an information retrieval system, in which the method is used for transforming a database statement containing a first subquery and a second subquery joined together, the first subquery including a group by operation over a child subquery. Also, the present invention may be embodied as an information retrieval system for transforming a database statement containing a first subquery and a second subquery joined together, the first subquery including a group by operation over a child subquery. Also, the present invention may be embodied as computer program product having a computer readable medium tangibly embodying computer executable code for directing an information retrieval system to transform a database statement containing a first subquery and a second subquery joined together, the first subquery including a group by operation over a child subquery.

A First Embodiment:

The following description of the first embodiment illustrates an aspect of the present invention for transforming a query. Other embodiments are described further below. Also described further below is an embodiment that combines different embodiments.

Turning now to the first embodiment, there is a table, EMPLOYEE, which contains basic information about employees (such as, employee number, employee name, salary, and department number, etc). A user has a view containing some aggregated information defined as follows. Here in addition to the data selected from the employee table, for each employee, there is also provided aggregated data of the maximum and total salary for the department. The following shows a given query.

```
create view emp_dept_salary as
(select *
from (select dept_no,
        sum(salary) as sum_salary,
        max(salary) as max_salary
    from employee
    group by dept_no ) as dept_salary,
    (select *
    from employee ) as emp_info
where dept_salary.dept_no = emp_info.dept_no );
```

The user normally uses this view for queries related to the employee and maximum and total salary information. Note that often, for security reasons, the view that a database user is allowed to access may be limited to some columns of the employee table. In this example, all the data is selected. For whatever reason, the user may not be able to access the employee table directly and may need to derive information from this view without the need to get the maximum and total salary for the department. For example, the user might want the count of the number of employees using the view as follows:

```
select count(*)
from emp_dept_salary;
```

Internally, the database engine expands the view and rewrites the given query as follows:

```
select count(*)
from (select dept_no, sum(salary), max(salary)
    from employee
    group by dept_no ) as dept_salary,
    (select *
    from employee ) as emp_info
where dept_salary.dept_no = emp_info.dept_no
```

The preferred embodiment transforms the given query within a database compiler (of the DBMS) as follows:

```
select count(*)
from employee
where dept_no is not null;
```

The correctness of this transformation depends on the fact that the join in the view emp_dept_salary is a lossless join, that is, each row from subquery "select*from employee" (called subq1 or subquery1) will match one row and only one row from subquery "select dept_no, max(salary), sum (salary) from employee group by dept_no" (called subq2 or subquery2). Since the subquery subq2 contributes nothing to the join and the output of the query does not use any result from subq2, then the subquery subq1 and the join may be eliminated.

FIG. 1 is a representation of a first given query to be transformed by the first embodiment. FIG. 2 is a representation of a first transformed query transformed from the first query of FIG. 1 by usage of the first embodiment.

To formulate the transformation provided by the first embodiment: if any query contains two subqueries joined together, and one of these subqueries has a group by (gb) over a child subquery subq1, and the other subquery subq2 which participates the join (as shown in FIG. 1), and if:

(1) subq1 matches with subq2 exactly;
(2) the group by partitioning columns are the same as the join columns in the join;
(3) the select output does not refer to any columns from gb output;
(4) there is no local predicate or "having" clause above the group by; and,
(5) the gb and subq1 are not referenced elsewhere in the query;

then the join between gb and subq2 may be eliminated which then removes the gb leg of the join.

The select output is referring to the output of the select operation that contains the join of gb and subq2. The gb output is referring to the columns output by the aggregation (gb) operation over subq1.

Generally, conditions (1), (3) and (4) may be relaxed. Techniques to match subqueries have been established in many commercial database compilers. These are used, for example when matching queries with materialized views. Queries are not only matched as exact matches but can be matched to detect subsumption when queries are not exactly matched. The result of these techniques is to separate the common portion of the two subqueries and formulate the compensation over the common portion to obtain the original subquery.

A Second Embodiment: Subqueries Not Exactly Matched:

In the case that the subquery subq1 and subquery subq2 is not exactly matched, if the subquery subq1 subsumes the subquery subq2, group by join elimination may still be performed. Here subq1 covers all the employees while subq2 covers only the employees with dept_no=3, as in the following example query:

create view emp_dept_salary as

```
( select *
  from (select dept_no,
          sum(salary) as sum_salary,
          max(salary) as max_salary
        from employee
        group by dept_no ) as dept_salary,
       (select *
        from employee
        where dept_no = 3) as emp_info
  where dept_salary.dept_no = emp_info.dept_no );
```

Consider the following view:

```
select count(*)
  from emp_dept_salary
```

After expanding the view, the view becomes:

```
select count(*)
  from (select dept_no, sum(salary), max(salary)
        from employee
        group by dept_no ) as dept_salary,
       (select *
        from employee
        where dept_no = 3) as emp_info
  where dept_salary.dept_no = emp_info.dept_no
```

This view may then be transformed internally as:

```
select count(*)
  from employee
  where dept_no = 3;
```

FIG. 3 is a representation of a second given query to be transformed by the second embodiment. FIG. 4 is an intermediate query transformed from the second given query of FIG. 3. FIG. 5 is a representation of a second transformed query transformed from the second given query of FIG. 3 by usage of the second embodiment.

So for any query that has two subqueries as in FIG. 3, if:

(1) subq1 subsumes subq2;
(2) the compensation sel_comp is a select (here the compensation sel_comp+subq1=subq2 (later there is a discussion of the case when compensation is not select);
(3) group by items in gb are same as the join columns in join of the select;
(4) the query does not refer to any column from gb output elsewhere in the query; and,
(5) there is no local predicate on gb in the select above;

then, the join between gb and subq2 may be eliminated to remove the gb leg of the join and change (transform) the query to FIG. 5.

Compensation is the adjustment required to use a different operation so that the different operation together with the adjustment or compensation produces the desired result. In a query, say it is desired to get the total amount of money paid to employees in a company. Say there was something that computed the total amount of money for all employees of that company. Instead of starting from scratch with the company wide data and adding the base salary, bonus, commissions etc., it is easier to take the company data and apply an additional predicate condition to filter the data so that only the lab employee data is seen. So the sel_comp simply is an additional operation on the company data to do the filtering. Subq2 may be taken and replaced by an equivalent subquery (select . . . from subq1 where . . . ). A group by_comp is is very similar to sel_comp except instead of the compensation being a "select" operation, it is a "group by" operation; gb_comp is compensation using a group by to make subq2 equivalent to an aggregation over subq1

A Third Embodiment: Compensation is Group By:

If the subq1 subsumes subq2 with a group by compensation as in the following example, it is still possible to perform the group by join elimination, as is shown below:

```
create view division_dept_salary as
  (select emp_info.* ,
    sum_salary,
    max_salary,
  from (select division_no,
      sum(salary) as sum_salary,
      max(salary) as max_salary
    from employee
    group by division_no) as dept_salary,
    (select division_no,
      dept_no,
      min(salary) as min_salary
    from employee
    group by division_no, dept_no) as emp_info
  where dept_salary.division_no = emp_info.division_no);
```

Consider the following query:

```
select division_no,
    dept_no,
    min_salary
  from division_dept_salary;
```

It will be turned (transformed) into the following query after expanding the view:

```
select division_no,
    dept_no,
    min_salary
  from (select division_no,
      sum(salary) as sum_salary,
      max(salary) as max_salary
    from employee
    group by division_no ) as dept_salary,
    (select division_no,
      dept_no,
      min(salary) as min_salary
    from employee
    group by division_no, dept_no) as emp_info
  where dept_salary.division_no = emp_info.division_no;
```

This query can be rewritten as:

```
select division_no, dept_no, min_salary
  from (select division_no,
      dept_no,
      min(salary) as min_salary
    from employee
    group by division_no, dept_no)
  where division_no is not null.
```

FIG. 6 is a representation of a third given query to be transformed by the third embodiment. FIG. 7 is another intermediate query transformed from the third given query of FIG. 6. FIG. 8 is a representation of a third transformed query transformed from the third given query of FIG. 6 by usage of the third embodiment;

In general, for any query that has two subqueries joined together as in FIG. 6, if:

(1) subq1 subsumes subq2;
(2) the compensation gb_comp is a group by (here gb_comp+subq1=subq2);
(3) the group by items in gb_comp is a super set of the group by items in gb;
(4) the join predicate in the select operation involves the group by items in gb and gb_comp as appropriate equality predicates;
(5) the query has no other reference to the aggregation functions output from gb; and,
(6) there is no local predicate on the gb in the select;

then the join between gb and subq2 may be eliminated to remove the gb leg of the join and change the query to that shown in FIG. 8.

A Fourth Embodiment: Query Refers to the Aggregation Function:

If the query refers to the aggregation function which is from the output of the gb, it is still possible to perform the group by join elimination.

```
create view emp_dept_salary as
  ( select emp_info.* ,
    sum_salary,
    max_salary,
  from (select dept_no,
      sum(salary) as sum_salary,
      max(salary) as max_salary
    from employee
    group by dept_no ) as dept_salary,
    (select *
    from employee ) as emp_info
  where dept_salary.dept_no = emp_info.dept_no );
```

The user uses this view for queries related to employee and salary information. Here is a query which get the employee, dept_no and the max salary in his department:

```
select emp_no, dept_no, max_salary
  from emp_dept_salary;
```

It will become the following query after expanding the view:

```
select emp_no,
    dept_no,
    max_salary
  from (select dept_no,
      sum(salary) as sum_salary,
      max(salary) as max_salary
    from employee
    group by dept_no ) as dept_salary,
    (select *
    from employee ) as emp_info
  where dept_salary.dept_no = emp_info.dept_no;
```

This query can be rewritten internally as:

```
select emp_no,
    dept_no,
    max(salary) over (partition by dept_no)
from employee
where dept_no is not null;
```

Further below is a description of the window aggregation that is part of the SQL language and implemented in some commercial databases.

FIG. 9 is a representation of a fourth given query to be transformed by the fourth embodiment. FIG. 10 is a representation of a fourth transformed query transformed from the fourth given query of FIG. 9 by usage of the fourth embodiment;

In general, if any query has two subqueries joined together as in FIG. 9, if:
(1) subq1 matches with subq2 exactly;
(2) the group by columns in gb are same as the join columns in the equality join predicates of the select;
(3) the select output does refer to aggregation functions from the output of gb;
(4) there is no local predicate on gb in the join of the select, then window aggregation function can be added in subq2 (if there is any reference of the aggregation function from the output of the gb) and eliminate the join between gb and subq2 by removing the gb leg of the join and internally rewriting the query to FIG. 10. Note that in this case, "exact match" of condition (1) was specified. In fact, it is possible to relax this condition if the compensation is a select operation and the predicate in compensation is on all group by items.

A Fifth Embodiment: Local Predicate on the Aggregation:

If the select operation has a local predicate on the gb output, it is still possible to perform the group by join elimination by pulling up the local predicate. Consider the example:

```
create view emp_dept_salary as
  ( select emp_info.* ,
    sum_salary,
    max_salary
  from (select dept_no,
      sum(salary) as sum_salary,
      max(salary) as max_salary
    from employee
    group by dept_no ) as dept_salary,
    (select *
     from employee ) as emp_info
  where dept_salary.dept_no = emp_info.dept_no
  and dept_salary.max_salary < 50000 );
```

Here is a query which gets the employee, dept_no and the max salary in his department:

```
select emp_no,
    dept_no,
    max_salary
from emp_dept_salary;
```

It will become the following query after expanding the view:

```
select emp_no,
    dept_no,
    max_salary
from (select dept_no,
    sum(salary) as sum_salary,
    max(salary) as max_salary
  from employee
  group by dept_no ) as dept_salary,
  (select *
   from employee ) as emp_info
where dept_salary.dept_no = emp_info.dept_no and
  dept_salary.max_salary < 50000
```

This query can be rewritten as:

```
select emp_no,
    dept_no,
    max(salary) over (partition by dept_no)
      as max_salary
from employee
where dept_no is not null and
    max_salary < 50000
```

FIG. 11 is a representation of a fifth given query to be transformed by the fifth embodiment. FIG. 12 is a representation of a fifth transformed query transformed from the fifth given query of FIG. 11 by usage of the fifth embodiment;

In general, if within a query, there are two subqueries joined together as in FIG. 11, if:
(1) subq1 matches subq2 exactly;
(2) the group by items in gb are the same as the join columns in the equality join predicate or predicates of the select operation; and,
(3) the local predicate on gb in the select can be pulled up (i.e. evaluated later);

then, the local predicate can be pulled up, the aggregation function can be replaced from the output of the gb by the window aggregation function in subq2, and the join between gb and subq2 can be eliminated by removing the gb leg of the join. The transformed query is shown in FIG. 12. Note, in this case "exact match" is specified as shown in the condition (1). In fact, this may be relaxed if the compensation is a select operation and the predicate in compensation is on all the group by items.

A Sixth Embodiment: Having Clause in gb Subquery:

If there is a having clause, it is still possible to perform the group by join elimination.

```
create view emp_dept_salary as
  ( select emp_info.* ,
    sum_salary,
    max_salary
  from (select dept_no,
      sum(salary) as sum_salary,
      max(salary) as max_salary
    from employee
    group by dept_no
```

-continued

```
        having sum_salary < 9000000 ) as dept_salary,
      (select *
        from employee ) as emp_info
      where dept_salary.dept_no = emp_info.dept_no);
```

Here is a query which gets the employee, dept_no and the max salary in his department:

```
      select emp_no, dept_no, max_salary
        from emp_dept_salary;
```

After expanding the view:

```
      select emp_no,
             dept_no,
             max_salary
        from (select dept_no,
                     sum(salary) as sum_salary,
                     max(salary) as max_salary
                from employee
                group by dept_no
                having sum_salary < 9000000) as dept_salary,
              (select *
                from employee ) as emp_info
        where dept_salary.dept_no = emp_info.dept_no;
```

This query can be transformed to the following:

```
      select emp_no,
             dept_no,
             max(salary) over (partition by dept_no)
                as max_salary,
             sum(salary) over (partition by dept_no)
                as sum_salary
        from employee
       where dept_no is not null and
             sum_salary < 9000000
```

FIG. 13 is a representation of a sixth given query to be transformed by the sixth embodiment. FIG. 14 is a representation of a sixth transformed query transformed from the sixth given query of FIG. 13 by usage of the sixth embodiment.

In general, if within a query there are two subqueries joined together as in FIG. 13, if:

(1) subq1 matches subq2 exactly;
(2) group by items in gb are same as the join columns in join of the select;
(3) the local predicate on gb in the select can be pulled up (i.e. evaluated later); and,
(4) the having clause predicate can be pulled up;

then, the local predicate and having clause may be pulled up, the gb aggregation may be replaced by the window aggregation function in subq2, the join between gb and subq2 may be eliminated, the gb leg of the join may be removed. The transformed query is shown in FIG. 14. The having clause is a predicate applied after the aggregation is completed. Note, in this case "exact match" was specified, as shown in the condition (1). In fact, this may be relaxed if the compensation is a select operation and the predicate in compensation is on all the group by items.

A Seventh Embodiment: Combination of Various Variations:

The various forms of group by join elimination described above can be combined together to handle more complicated views and queries. Here is an example:

```
      create view division_dept_salary as
        (select emp_info.* , sum_salary, max_salary,
          from (select division_no,
                       sum(salary) as sum_salary,
                       max(salary) as max_salary
                  from employee
                  group by division_no
                  having sum_salary > 9000000) as dept_salary,
                (select division_no,
                        dept_no,
                        salary
                        min(salary) as min_salary
                   from employee
                   group by division_no, dept_no) as emp_info
           where dept_salary.division_no = emp_info.division_no);
```

Here is a query with an additional predicate on max_salary

```
      select division_no, dept_no, max_salary
        from division_dept_salary
       where max_salary < 50000;
```

After expanding the view, the result is:

```
      select division_no, dept_no, max_salary
        from (select division_no,
                     sum(salary) as sum_salary,
                     max(salary) as max_salary
                from employee
                group by division_no ) as dept_salary,
              (select division_no,
                      dept_no, salary,
                      min(salary) as min_salary
                 from employee
                 group by division_no, dept_no) as emp_info
         where dept_salary.division_no = emp_info.division_no
           and max_salary < 50000;
```

This query can be rewritten as:

```
      select division_no, dept_no, max_salary
        from ( select division_no, dept_no,
                      sum(salary) over (partition by division_no)
                         as sum_salary,
                      max(salary) over (partition by division_no)
                         as max_salary
                 from (select division_no,
                              dept_no,
                              salary, min(salary) as min_salary
                         from employee
                         group by division_no, dept_no)
                  where division_no is not null )
          where sum_salary > 9000000 and
                max_salary < 50000;
```

FIG. 15 is a representation of a seventh given query to be transformed by the seventh embodiment. FIG. 16 is a representation of a seventh transformed query transformed from the seventh given query of FIG. 15 by usage of the seventh embodiment.

An Eighth Embodiment: Extensions Together with Other Transformations:

Some queries may not have an explicit join between the subqueries. However, there may be cases where other constructs such as IN or EXISTS subquery predicates might be converted into joins as part of other transformations that are known to those skilled in the art. Once these transformations have come into play, it is possible to take advantage of the group by join eliminations as described above.

```
create view dept_salary as
   (select emp_name,
       department.dept_name,
       max_salary,
    from department,
       employee
    where employee.dept_no = department.dept_no and
       department.dept_no IN (select dept_no
          from employee
          group by dept_no
          having max(salary) >
             100000)
    group by emp_name, dept_name;
   Given a query:
select *
from dept_salary
```

The IN subquery predicate is converted into a join after expanding the view.

```
select emp_name, department.dept_name, max_salary,
from department dept,
   employee emp,
   (select dept_no
    from employee
    group by dept_no
    having max(salary) > 100000) as empmax
where employee.dept_no = department.dept_no and
   empmax.dept_no = department.dept_no
group by emp_name, dept_name
```

FIG. 17 is a representation of an eighth given query to be transformed by the eighth embodiment. FIG. 18 is yet another intermediate query transformed from the eighth given query of FIG. 17. FIG. 19 is a representation of an eighth transformed query transformed from the eighth given query of FIG. 17 by usage of the eighth embodiment.

In this embodiment, it can be seen that the gb2 and gb1 are over the same table and the grouping columns are involved in the equality join predicates and are very similar. The one difference between this and other examples shown before is that the subqueries are at different levels but since they match exactly, one of them can be eliminated Window Aggregation:

While most SQL users are familiar with regular aggregation functions like MAX, MIN, SUM and AVG, there has been a relatively recent adoption of a another class of aggregation functions. These are window aggregation functions that work on a specified group of rows and report the result on the current row being evaluated. This is both an aggregation function and in some sense a scalar function since it does not collapse the rows involved in computing the aggregation. The general format of such a function that has been adopted by the SQL standard is shown in FIG. 20.

The OVER clause specifies the three primary attributes of the function. These three attributes are optional. The order-clause is like an ORDER BY clause of a statement except that the order is only referenced in the context of the function. The partition-clause is similar to the commonly used GROUP BY clause but again applies in the context of the function. The window-agg-group allows the specification of a window of rows to which the aggregation is applied.

For the purpose of this paper, the partition-clause will be expanded upon. This will help illustrate the intended WinMagic transformations. The order-clause can be exploited to better specifiy the rows that need to be referenced. For example, one could get a seven day moving average of stock prices by ordering on date and specifying that the average needs to be computed from the stock price of the previous three rows, the current row and the following three rows.

To illustrate the use of the partition-clause, in the following query, for each employee, the department, salary and the sum of all salaries within the employee's department are obtained. Note that the deptsum column value is repeated for each row that corresponds to that department. This repetitive information may or may not be output directly but could be used to compute other useful information. For example, in the statement below, the final column gives the percentage of the employee's salary in proportion to the total salary of all employees within the department.

```
SELECT empnum, dept, salary,
   SUM(salary) OVER (partition by dept) AS deptsum
   DECIMAL(salary,17,0) * 100 /
      SUM(salary) OVER(partition by
dept) AS salratio
FROM employee;
```

| EMPNUM | DEPT | SALARY | DEPTSUM | SALRATIO |
|---|---|---|---|---|
| 1 | 1 | 78000 | 383000 | 20.365 |
| 2 | 1 | 75000 | 383000 | 19.582 |
| 5 | 1 | 75000 | 383000 | 19.582 |
| 6 | 1 | 53000 | 383000 | 13.838 |
| 7 | 1 | 52000 | 383000 | 13.577 |
| 11 | 1 | 50000 | 383000 | 13.054 |
| 4 | 2 | — | 51000 | — |
| 9 | 2 | 51000 | 51000 | 100.000 |
| 8 | 3 | 79000 | 209000 | 37.799 |
| 10 | 3 | 75000 | 209000 | 35.885 |
| 12 | 3 | 55000 | 209000 | 26.315 |
| 0 | — | — | 84000 | — |
| 3 | — | 84000 | 84000 | 100.000 |

It will be appreciated that variations of some elements are possible to adapt the invention for specific conditions or functions. The concepts of the present invention can be further extended to a variety of other applications that are clearly within the scope of this invention. Having thus described the present invention with respect to the preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A computer implemented method for transforming a database statement containing a first subquery and a second subquery joined to the first subquery, the first subquery including a GROUP BY operation over a child subquery, the method comprising:

removing the first subquery from the database statement thereby eliminating the JOIN between the first subquery and the second subquery, wherein removal of the first subquery and elimination of the JOIN between the first subquery and the second subquery creates a transformed database statement that includes the second subquery and excludes the first subquery, and wherein the child subquery subsumes the second subquery, the child subquery is equivalent to the second subquery when a GROUP BY compensation operation is applied to the child subquery, a plurality of columns in the GROUP BY compensation operation is a super set of one or more columns in the GROUP BY operation, the JOIN between the first subquery and the second subquery involves an equality predicate between at least one column in the GROUP BY operation and at least one column in the GROUP BY compensation operation, one or more aggregation functions in the first subquery are not referenced elsewhere in the database statement, and the first subquery does not include a local predicate on the GROUP BY operation.

2. The method of claim 1, further comprising:

adding a window aggregation function in the second subquery corresponding to an aggregation function in the first subquery when the database statement references the aggregation function in the first subquery.

3. The method of claim 1, further comprising:

inserting a window aggregation function in the second subquery corresponding to an aggregation function in the first subquery; and transferring a local predicate on the aggregation function in the first subquery to the inserted corresponding window aggregation function in the second subquery.

4. The method of claim 3, wherein the transferred local predicate is pulled up.

5. The method of claim 1, further comprising:

pulling up a HAVING clause on the GROUP BY operation in the first subquery; and including a window aggregation function in second subquery corresponding to an aggregation function in the first subquery.

\* \* \* \* \*